July 13, 1926.
R. G. HAMAKER
1,592,202
SHOCK ABSORBING WALKING BEAM
Filed March 15, 1926
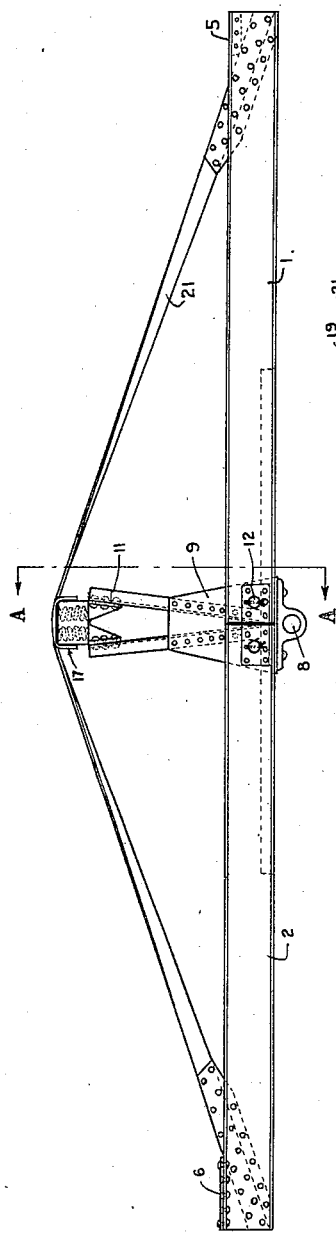
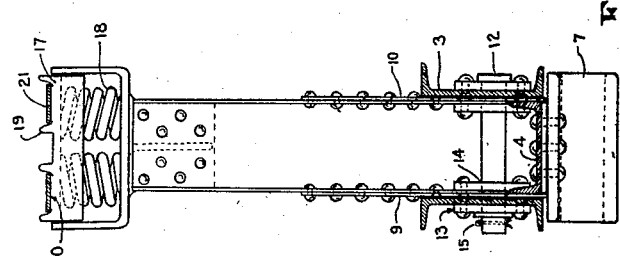
Rex G. Hamaker INVENTOR.
BY Jesse R. Stone
ATTORNEY.

Patented July 13, 1926.

1,592,202

UNITED STATES PATENT OFFICE.

REX G. HAMAKER, OF HOUSTON, TEXAS.

SHOCK-ABSORBING WALKING BEAM.

Application filed March 15, 1926. Serial No. 94,695.

My invention relates to walking beams such as are ordinarily employed in standard drilling and pumping rigs in oil field work.

In the use of standard rigs, particularly in pumping deep wells, there is an uneven jerky action of the pump rods, operated by means of the walking beam, which causes excessive vibration both on the rods and the pump. This is due to the fact that after the pump rods, together with the pump plunger and the load of fluid, are raised on the upstroke, they are then allowed to drop by their own weight, causing a sudden shock upon the parts of the pump. The result is an annoying jerk and vibration with a crystallizing effect on the rods and a rapid deterioration of the pump, as well as the operating apparatus.

It is an object of my invention to provide a walking beam constructed to absorb the shocks upon the beam at all times and particularly on the rods during the down stroke of the pump plunger. It is desired to so construct the beam that it will have the effect of a resilient, but strong, rocking arm, which will flex slightly under vibration and shock.

Referring to the drawing herewith wherein like characters of reference are applied to like parts in both views, Fig. 1 is a side elevation of a walking beam to which my invention is adapted. Fig. 2 is a transverse section on the plane A—A of Fig. 1.

The walking beam may be made of one or more sections resiliently constructed. In the drawing, I have shown the beam as made in two equal sections, 1 and 2. Each section is shown as having two side plates of channel iron construction spaced apart at their adjacent sides by a third or base plate 4 of channel iron form, the side flanges of which are presented upwardly between the side plates. There are also spacing blocks 5 and 6 at the outer ends of sections 1 and 2, respectively, the block 5 adapted to support the pump rod yoke and the block 6 the pitman yoke, in well operations.

The base plate 4 is a short plate extending for a short distance along the base at the inner end of each section. It is secured upon the bearing saddle 7, as will be seen in Fig. 2. The said saddle is formed with a bearing 8 to receive a shaft or pin upon which it may rock in use.

The two sections 1 and 2 are pivoted at their inner ends to a central post made up of two side plates 9 and 10, to which are rigidly fixed upwardly diverging post members 16 of channel iron, the adjacent upper ends of which form a tapered seat for a spring box 11. The pivoted connection is made of a bearing pin 12 extending through the side plates 1 and 2 and the attaching plates 9. The bearing may be made more solid by the addition of bearing blocks 13 and 14 on the outer and inner sides of each plate. The pin 12 is held against removal by the cotter pin 15 therein.

The shock absorbing feature is provided through the resilient member at the upper end of the post 16. This member comprises a housing or box having its lower end tapered to fit the seat 11 to which it is rigidly secured by riveting or otherwise. The upper portion comprises a U-shaped plate 17, the inner portion of the base of the U-shaped plate forming a support for a plurality of compression springs 18 of which I have shown four. Said springs support a cap plate which is slidable vertically between the arms of the box. Its ends are directed downwardly to enclose the springs 18. The upper face of the cap has four transverse lugs or flanges 19, thus providing two seats 20 for the truss members 21.

The said truss members are made up of a strap or straps of resilient material such as iron or steel. Said straps are riveted to the beam at their ends and are turned to lie in horizontal position in the seats 20 on the resiliently supported bearing cap 17. They are taut when the beam is in horizontally aligned position but are flexed slightly when there is a strain or shock exerted at the ends of the beam.

It will be noted that, in operation, of my beam, a shock or pull upon the end of the beam will cause the end sections to give slightly by pivoting on the bearing pins 12. This will exert a downward force upon the spring shock absorber at 18, thus preventing undue vibration or strain. The central plate 4 prevents side play of the sections relative to each other and holds them in alignment, but does not interfere with flexing of the beam. The ends of the sections are spaced slightly to allow the "breaking" of the beam at the center in the manner described.

This construction of beam has many advantages which will be understood by those skilled in the art without further description. The details of construction of my device are subject to various modifications without departing from the spirit of the invention.

What I claim as new and desire to protect by Letters Patent is:

1. In a walking beam, a beam made up of two sections, a central post to which said sections are pivoted, a resilient support on said post, and a flexible member secured at the ends of said beam and bearing on said support.

2. In a device of the character described, a beam made up of two sections, a central post to which said sections are pivotally attached, and means supported on said post to hold the said sections resiliently in alignment.

3. In a device of the character described, a beam made up of two sections pivotally supported at their inner ends and adapted to flex in a vertical plane, and shock absorbing means to resist the flexing of said beam.

4. In a device of the character described, a beam made up of a plurality of sections, a central post to which said sections are pivoted, means to resiliently oppose the movement downwardly of the outer ends of said sections, and means to hold them in lateral alignment.

5. In a walking beam made of two longitudinal sections, means to allow the simultaneous downward movement of the outer ends of said sections of the beam, and means to resiliently resist said movement, said resilient means being supported intermediate the ends of the beam.

In testimony whereof I hereunto affix my signature this 11th day of March, A. D. 1926.

REX G. HAMAKER.